United States Patent [19]

Satou

[11] Patent Number: 5,325,288
[45] Date of Patent: Jun. 28, 1994

[54] AUTOMATIC PID CONTROLLER IN WHICH THE RATIO OF THE CONTROL TARGET VALUE TO THE CONTROL SIGNAL IS USED TO OPTIMIZE PERFORMANCE

[76] Inventor: Nobuyasu Satou, 11-3-501, Minamifujisawa, Fujisawa-shi, Kanagawa-ken, Japan

[21] Appl. No.: 942,884

[22] Filed: Sep. 11, 1992

[30] Foreign Application Priority Data

Jul. 16, 1992 [JP] Japan ................................. 4-189325

[51] Int. Cl.$^5$ ................................................. G05B 13/02
[52] U.S. Cl. ..................................... 364/162; 364/161; 364/163
[58] Field of Search ................ 364/161, 162, 163, 160

[56] References Cited

U.S. PATENT DOCUMENTS

| | | | |
|---|---|---|---|
| 3,925,640 | 12/1975 | Duggan | 235/150.1 |
| 4,197,577 | 4/1980 | Johnson et al. | 364/118 |
| 4,881,160 | 11/1989 | Sakai et al. | 364/161 |
| 4,903,192 | 2/1990 | Saito et al. | 364/157 |
| 4,951,191 | 8/1990 | Hiroi et al. | 364/165 |
| 5,091,844 | 2/1992 | Waltz | 364/153 |
| 5,119,287 | 6/1992 | Nakamura et al. | 364/148 |
| 5,126,933 | 6/1992 | White, III | 364/148 |
| 5,153,807 | 10/1992 | Saito et al. | 364/165 |
| 5,195,028 | 3/1993 | Hiroi | 364/161 |

Primary Examiner—Jerry Smith
Assistant Examiner—Cameron H. Tousi
Attorney, Agent, or Firm—Kenyon & Kenyon

[57] ABSTRACT

A control target value $x_s$, a present control signal $x(n)$, and a present operating signal $y(n)$ are input to a first control element which calculates $r(n).y(n)$ where $r(n)$ is the value of the ratio of the control target value to the control signal ($=x_s/x(n)$). The control target value $x_s$, the control signal $x(n)$, and a differential parameter $kd$ of the conventional PID control set by a parameter setting device are input to a second control element which calculates $kd.r(n)(\Delta x_s(n)-r(N).\Delta x(n))$ where $\Delta x_s(n)=x_s(n)-x_s(n-1)$ and $\Delta x(n)=x(n)-x(n-1)$. The outputs of both control elements are added to yield the next operating signal $y(n+1)$. This design can provide an automatic control apparatus capable of achieving a good control performance even if an object element has a non-linear characteristic.

8 Claims, 2 Drawing Sheets

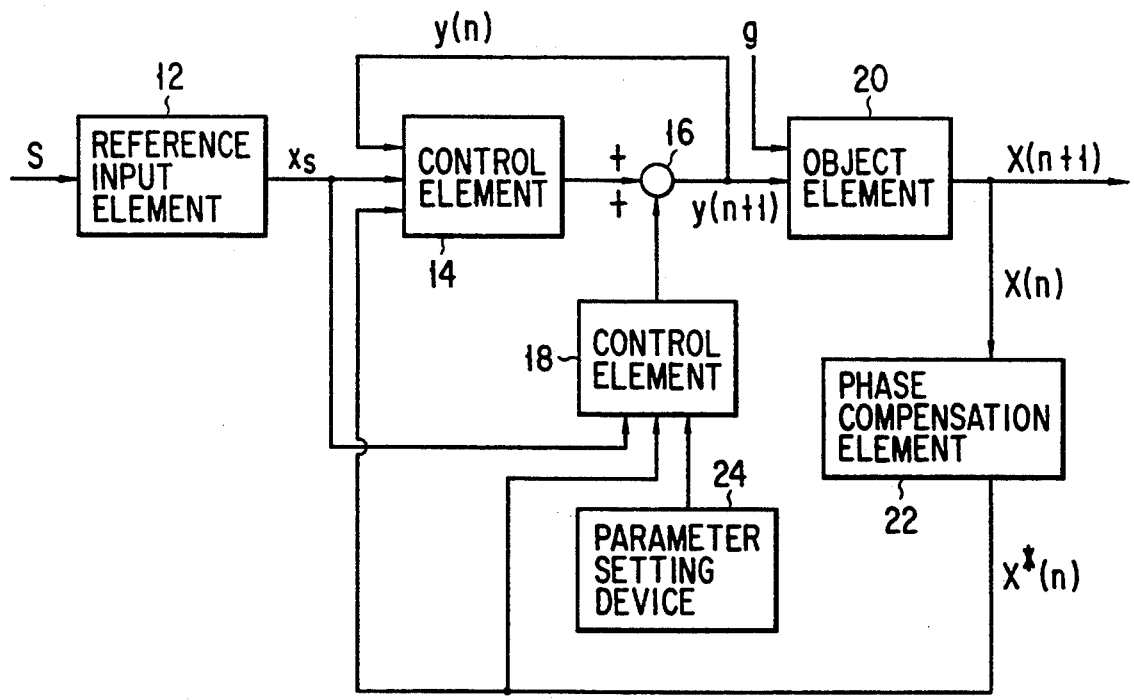
F I G. 2

AUTOMATIC PID CONTROLLER IN WHICH THE RATIO OF THE CONTROL TARGET VALUE TO THE CONTROL SIGNAL IS USED TO OPTIMIZE PERFORMANCE

BACKGROUND OF THE INVENTION

1. Field of the Invention

The present invention relates to an automatic control apparatus which controls an operating signal to be supplied to a control apparatus in such a manner that status variables of the control apparatus, such as temperature, flow rate, pressure, and level, coincide with target values.

2. Description of the Related Art

For control of this type, a PID (Proportional-Integral-Derivative) control apparatus is widely used due to its good general-purpose design. The conventional PID control apparatus performs a PID operation on the deviation between the operating signal of the control apparatus and a control signal output from the control apparatus used to acquire the operating signal of the control apparatus.

FIG. 1 shows a basic block diagram of the conventional PID control apparatus. A physical target value s is input to a reference input element 2, which converts the received physical target value s into a control target value $x_s$. A deviation between the control target value $x_s$ and a control signal x of an object element 4, $\epsilon_s (= x_s - x)$, is supplied to a PID controller 6. A transfer function Gc(S) of the PID controller 6 is expressed as follows.

$$Gc(S) = KP + KI/S + KD.S \qquad (1)$$

where
KP: proportional gain
KI: integral time
KD: differentiation time
S: Laplace operator An operating signal y $(=\epsilon_s.Gc(S))$ output from the PID controller 6 is supplied to the object element 4. The object element 4 is also supplied with a disturbance g.

In this conventional PID control apparatus, the values of the individual parameters KP, KI, and KD are determined on the assumption that the object element 4 (the relation between the operating signal and the control signal) has a linear characteristic. In other words, the values of the individual parameters are determined by linearly approximating the characteristic of the object element in the vicinity of the operating signal y when a target value $x_s$ is given. In the conventional control apparatus, once the values of parameters are determined, they will not be set again even if the target value is changed. The conventional control apparatus cannot therefore provide satisfactory control results for object elements having a non-linear characteristic, such as an induction motor, a distillation plant, and a flow valve.

This problem results from the fact that the information source for a control arithmetic operation depends only on the deviation $\epsilon_s$ between the control signal x and the control target value $x_s$ at that time. In the differentiation operation, information regarding the correlation between the control target value $x_s$ and the control signal x will be lost. That is, the differentiation of the deviation in the conventional PID control is expressed as follows.

$$d\epsilon_s/dt = dx_s/dt - dx/dt \qquad (2)$$

Since the control target value $x_s$ is often constant, $dx_s/dt = 0$ so that the information regarding the correlation between $x_s$ and x, particularly, the information of the control operation concerning the magnitude of x with $x_s$ taken as a reference, will be lost as a consequence of the differentiation. In the case where an object element having a non linear characteristic is to be controlled, the values of parameters cannot be varied with a change in the target value, so that the original purpose of the differentiation to provide a control operation cannot be accomplished.

All the conventional PID control apparatuses have this shortcoming irrespective of whether they employ an analog system (continuous control system) or a digital system (sampled value control system).

SUMMARY OF THE INVENTION

Accordingly, it is an object of the present invention to provide an automatic control apparatus capable of yielding good control results even when an object element has a non-linear characteristic.

According to one aspect of the present invention, there is provided an automatic control apparatus which multiplies the ratio of a target value of a control signal of an object element to the control signal by an operating signal, adds a differential value of the deviation-ratio which is the difference between the ratio and a reference value of the ratio to the result of multiplication, and corrects the operating signal based on the result of addition, thereby performing a PID control operation based on the deviation-ratio.

According to another aspect of the present invention, there is provided an automatic control apparatus which multiplies the ratio of a target value of a control signal of a object element to the control signal and corrects the operating signal based on the result of multiplication, thereby performing a PI control operation based on the ratio.

According to the automatic control apparatus embodying the present invention, the deviation-ratio, which is the difference between the ratio of the control target value to the control signal and the reference value of the ratio is differentiated, so that the differential value includes the ratio and the differential value varies in accordance with the control target value. This automatic control apparatus can therefore well control even an object element having a non-linear characteristic.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a block diagram illustrating the structure of an automatic control apparatus according to a first embodiment of the present invention;

DETAILED DESCRIPTION OF THE PREFERRED EMBODIMENT

Figure 1:
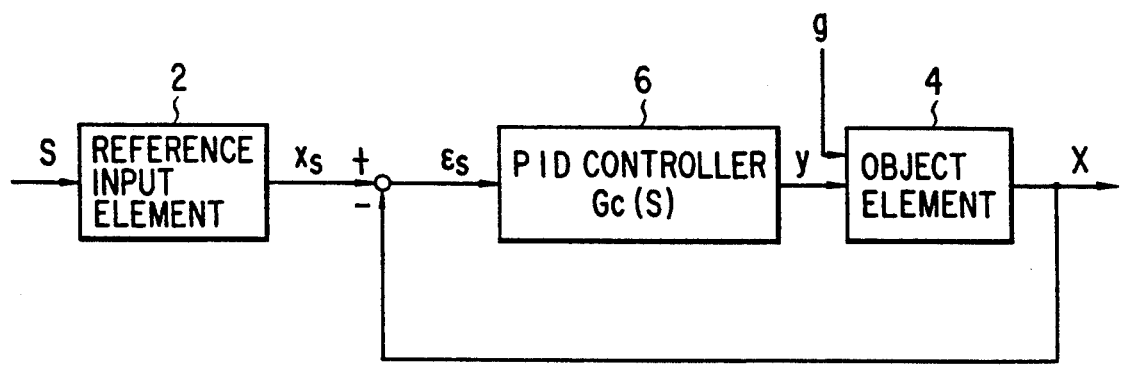
FIG. 1 is a block diagram of a conventional PID control apparatus.

A preferred embodiment of an automatic control apparatus according to the present invention will now be described with reference to the accompanying drawings.

To begin with, the principle of the present invention will be described. The description is premised on digital control to perform a control operation while effecting sampling every given time. The feature of the present invention lies in that the ratio of a control target value $x_s$ to a control signal $x(n)$ at a present time n is used as a control information source, and a ratio value r ($=x_s/x(n)$) is defined accordingly. A ratio value $r_0(=x_s/x_s=1)$ at a point in time when the control operation is complete and the control signal $x(n)$ has converged to the control target value $x_s(x(n) \to x_s)$ is used as a reference value of that ratio value. A parameter, the deviation-ratio value $\epsilon_R$ ($=r-r_0$), is defined from this ratio value. That is, $\epsilon_R = r - 1$.

When an PID control arithmetic operation is performed as a typical form of general-purpose control using this deviation-ratio value $\epsilon_R$, an operating signal y in an analog form will be expressed as follows.

$$y = KP.\epsilon_R + KI.\int \epsilon_R dt + KD.d\epsilon_R/dt \quad (3)$$

where
KP: proportional gain
KI: integral time
KD: differentiation time

When the control operation is complete, the states remain stable in equation (3), i.e., $dy/dt=0$, $d\epsilon_R/dt=0$, and $d^2\epsilon_R/dt^2=0$.

Differentiating equation (3) and substituting those conditions, equation (3) is rewritten as follows.

$$dy/dt = KP.d\epsilon_R/dt + KI.\epsilon_R + KD.d^2\epsilon_R/dt^2 \quad (4)$$

$$\therefore 0 = KI.\epsilon_R \quad (5)$$

When the convergence is reached therefore, the deviation-ratio value $\epsilon_R$ becomes 0, i.e., the ratio value becomes $r=1$, from which the validity of the equation (3) can be confirmed.

If a ratio value $r=1$ is used instead of the deviation-ratio value $\epsilon_R$ in the equation (3), differentiating this equation and substituting the same conditions as mentioned above into the result yields $r=0$, which is different from what should originally been acquired by the control. It is also apparent from this that the use of the deviation-ratio value $\epsilon_R$ as an information source is correct.

It will be described that a proportional term in the equation (3) (first term on the right-hand side of that equation) and an integral term (second term on the right-hand side of that equation) are expressed simply as one term by using an operating signal $y(n)$ at a present time. As the integration serves to set a stationary deviation (offset) caused by the proportional control back to zero, the integral term is also called a reset term.

Since a control equation for the PID operation is acquired by adding a differential term to a control equation for the PI operation, the PI operation will be considered first. The following equation will be considered, which is obtained by removing the differential term $KD.d\epsilon_R/dt$ from equation (3).

$$y = KP.\epsilon_R + KI.\int \epsilon_R dt \quad (6)$$

Substituting the definition of the deviation-ratio value, $\epsilon_R = r - 1$, into equation (6), equation (6) can be rewritten as follows.

$$y = KP.r + (KI.\int \epsilon_R dt - KP) \quad (7)$$

By treating the parameter KP in the proportional term as a variable parameter and setting $KP = KI.\int \epsilon_R dt$, the equation (7) can be simplified as follows.

$$y = KP.r \quad (8)$$

Although KI does not appear in the equation (8), this equation includes an integration term because $KP = KI.\int \epsilon_R dt$. Thus, the equation (8) represents a control equation for the PI operation using a ratio value.

Assuming the state where the control operation is complete ($x(n) \to x_s$), i.e., $r \to 1$, in equation (8), KP should match the operating signal $y(n)$ at that time. From this, the following conclusion is obtained.

$$KP = y(n) = KI.\int \epsilon_R dt \quad (9)$$

Equation (9) indicates a set value of the parameter KP in the proportional term.

From equations (8) and (9), therefore, the digital expression of the PI control using the concept involving the deviation-ratio value $\epsilon_R$ will be given as follows.

$$y(n+1) = y(n).r \quad (10)$$

As it is apparent from equation (10) that the PI control using the deviation-ratio value $\epsilon_R$ does not need the parameters KP and KI, the PI control can be achieved by simply multiplying the ratio value by the current operating signal. This eliminates the need for setting the individual parameters, thus simplifying the structure of the control system.

Using the equation (10), the digital expression of the PID control will be given as follows.

$$y(n+1) = y(n).r + KD.d\epsilon_R/dt \quad (11)$$

The differentiation of the deviation-ratio value $\epsilon_R$ will be considered, which is necessary to achieve the equation (11).

Differentiating the deviation-ratio value $\epsilon_R$ yields $d\epsilon_R/dt$ $= d(r-1)/dt$ $= dr/dt$ $= d(x_s/x(n))/dt$ $$= \left(\frac{1}{x(n)}\right) \cdot \left[\frac{dx_s}{dt} - \left(\frac{x_s}{x(n)}\right) \cdot \left(\frac{dx(n)}{dt}\right)\right] \quad (12)$$

$$\therefore d\epsilon_R/dt = (1/x(n)) \cdot (dx_s/dt - r \cdot (dx(n)/dt)) \quad (13)$$

It is apparent from equation (13) that even if the deviation-ratio value $\epsilon_R$ is differentiated, the correlation information r between the control target value $x_s$ and the control signal x will not be lost. In the case of so-called follow-up control in which the control target value $x_s$ varies, a good follow-up characteristic is provided even if the object element has a non-linear characteristic.

When the equation (13) is expressed in a digital form using a sampling period $\Delta\tau$ together with the differential parameter KD, the second term on the right-hand side of the equation (11) will be expressed as follows.

$KD \cdot \Delta\epsilon_R$ $= KD \cdot \Delta r$ $= (KD/x(n)) \cdot (\Delta x_s(n) - r(n) \cdot \Delta x(n)) \quad (14)$ where $\Delta r = r(n) - r(n-1)$ With the differential parameter (differentiation time) denoted by kd, the differential term for the conventional PID control will be expressed as follows.

$kd \cdot \Delta\epsilon_s = kd \cdot (\Delta x_s - \Delta x(n)) \quad (15)$ where $\epsilon_s = x_x - x(n)$ $\Delta\epsilon_s \epsilon_s(n) - \epsilon_s(n-1)$ When x(n) is in close vicinity to $x_s$, $\Delta x_x(n) - r(n) \cdot \Delta x(n)$ in the equation (14) and $\Delta x_s - \Delta x(n)$ in the equation (15) both become 0. From the equations (14) and (15), the following relation will be acquired.

$KD = kd \cdot x_s \quad (16)$

It is apparent from the equation (16) that the differential parameter KD is the conventional differential parameter kd multiplied by the control target value $x_s$ and varies with a change in the control target value $x_s$ even if kd is constant. This means that the follow-up control characteristic is improved even when the object element has a non-linear characteristic.

By substituting the equation (16) into the equation (14), the digital expression of the differential term for the PID control according to the present invention will be given as follows.

$kd \cdot r(n) \cdot (\Delta x_s(n) - r(n) \cdot \Delta x(n)) \quad (17)$ where $r(n) = x_s(n)/x(n)$ $\Delta x_s(n) = x_s(n) - x_s(n-1)$ $\Delta x(n) = x(n) - x(n-1)$ It is apparent from the equation (17) that the differential term for the PID control according to the present invention can be acquired by attaining the value of kd in the conventional PID control instead of attaining the value of KD. The auto-tuning method to acquire kd is well known. As the value of the whole differential term varies in accordance with the correlation between $x_s$ and x(n) in the respective convergent states and the proper control operation is performed on the object element having a non-linear characteristic by varying the differential parameter in accordance with the non-linearity, the present invention can provide a control operation superior to the conventional PID control that changes the control state according to the load state.

From the above, it is apparent that the digital expression of the control operation based on the deviation-ratio value $\epsilon_R$ according to the present invention can be expressed as follows using the equations (11) and (17).

$y(n+1)$ $= r(n) \cdot y(n)$ $+ kd \cdot r(n) \cdot (\Delta x_s(n) - r(n) \cdot \Delta x(n)) \quad (18)$ Rearranging the equation (18) yields $y(n+1)$ $= r(n) \cdot \{y(n) + kd \cdot (\Delta x_s(n) - r(n) \cdot \Delta x(n))\} \quad (19)$ While equation (19) is the basic form of the control operation according to the present invention, the differential terms $\Delta x_s(n)$ and $\Delta x(n)$ should be treated in the actual use as incomplete differential terms to include a filter as has conventionally been done in order to avoid the influence of noise or the like on the differential term. An example of the incomplete differential is $TD \cdot S/(1+0.1 \times TD \cdot S)$. This denominator is the coefficient of a low-pass filter that removes harmonic noise.

The block diagram in FIG. 2 illustrates a specific arrangement to achieve equation (19). A physical target value s is input to a reference input element 12, which converts the received target value "s" into a control target value $x_s$. This control target value $x_s$ is input to control elements 14 and 18. Control element 14 receives the control target value $x_s$, a control signal $x^*(n)$ after phase compensation, and a present operating signal y(n) and calculates the first term on the right-hand side of the equation (18), r(n) y(n). Control element 18 receives the control target value $x_s$, the control signal $x^*(n)$ after phase compensation, and a parameter kd set by a parameter setting device 24 and calculates the second term on the right-hand side of the equation (18), $kd \cdot r(n) \cdot (\Delta x_s(n) - r(n) \cdot \neq x(n))$.

The outputs of the control elements 14 and 18 are added together by an adder 16, and the result of addition is supplied as an operating signal y(n+1) expressed by the equation (18) to an object element 20 and is also fed back to the control element 14. The object element 20 is also supplied with disturbance g. The control signal x(n) output from the object element 20 is fed back via a phase compensation element 22 to the control elements 14 and 18. The parameter setting device 24 determines the differential parameter kd by a well-known auto-tuning method, such as the Ziegler-Nichols ultimate method or step response method, and supplies kd to the control element 18.

The ratio value r used to define the deviation-ratio value $\epsilon_R$, as it is expressed by $r = x_s/x(n)$, requires information of the amplitude ratio of $x_s$ to $x(n)$ at a sampling time in the present invention. To execute the correct control operation, therefore, it is necessary to acquire a true ratio value $r^*$ by compensating the phase difference between $x_s$ and $x(n)$. The phase compensation element 22 is provided for this purpose. In other words, $x^*(n)$ is the amplitude of phase-compensated control signal $x(n)$. The specific design of this phase compensation element 22 is accomplished by using the transfer function and frequency response as done conventionally. For instance, when the control signal $x(n)$ has $|x(n)| \exp(j\phi_n)$ and a phase $\phi_n$, the amplitude is set to $x^*(n) = |x(n)|$.

Replacing $r^*(n)$ with $r(n)$ in the aforementioned control equations, the equation (19) is rewritten as follows.

$$y(n+1)$$
$$= r^*(n) \cdot \{y(n) + kd \cdot (\Delta x_s(n) - r^*(n) \cdot \Delta x(n))\} \quad (20)$$

where $$r^*(n) = x_s(n)/x^*(n)$$

Thus, the control elements 14 and 18 actually compute the first and second terms on the right-hand side of the equation (20), respectively.

The discussion so far has been given on the control system having a positive characteristic or the control system (object element) whose control signal x increases with an increase in the operating signal y to converge to the target value $x_s$. In general, there is a control system having a characteristic opposite to the positive characteristic. The characteristic of this control system is such that the control signal x decreases with an increase in the operating signal y to converge to the target value $x_s$. The control system having the opposite characteristic is called a control system having a negative characteristic. In the control system having a negative characteristic, the ratio value becomes $r' = x(n)/x_s$, and the deviation-ratio value becomes $\epsilon_R' = r' - 1$. In this case, the control operation equation, like the one for the positive characteristic, is expressed as follows.

The operation equation for the control system having a negative characteristic, which corresponds to equation (20), is given as follows.

$$y(n+1)$$
$$= (1/r^*(n)) \cdot \{y(n) - kd \cdot (\Delta x_s(n) - r^*(n) \cdot \Delta x(n))\} \quad (21)$$

where $$r^*(n) = x_s(n)/x^*(n)$$

It is apparent from equation (21) that the block diagram for the control system having a negative characteristic is basically the same as the one shown in FIG. 2. In the case of the negative characteristic, however, control element 14 calculates the first term on the right-hand side of equation (21), $y(n)/r^*(n)$, while control element 18 calculates the second term on the right-hand side of the equation (21), $$-(kd/r^*(n)) \cdot (\Delta x_s(n) - r^*(n) \cdot \Delta x(n)).$$

As described above, because the first embodiment performs the control operation using the deviation-ratio value $\epsilon_R (= r - 1)$ derived from the value of the ratio r $(= x_s/x(n))$ of the control target value $x_s$ to the control signal $x(n)$, the correlation between the control target value $x_s$ and the control signal $x(n)$ will not be lost even by the differentiation, making it possible to provide an automatic control apparatus which can well follow a change in the target value. Further, as the differential parameter KD varies with a change in the target value, the robust characteristic can be improved. Furthermore, as the differential parameter KD is obtained by simply multiplying the parameter kd, acquired using the conventional auto-tuning method, by the target value, the parameter KD can be easily attained. With regard to the frequency response, when the phase of the feedback signal is shifted by $-180°$, the deviation value $\epsilon_s$ becomes equal to $x_s - (-x) = x_s + x$, which is actually the addition of $x_s$ and x. This provides the positive feedback to cause oscillation. Such positive feedback will not occur in the system of the present invention using the ratio of physical amounts (ratio value), so that the frequency response will not be deteriorated.

Figure 3:
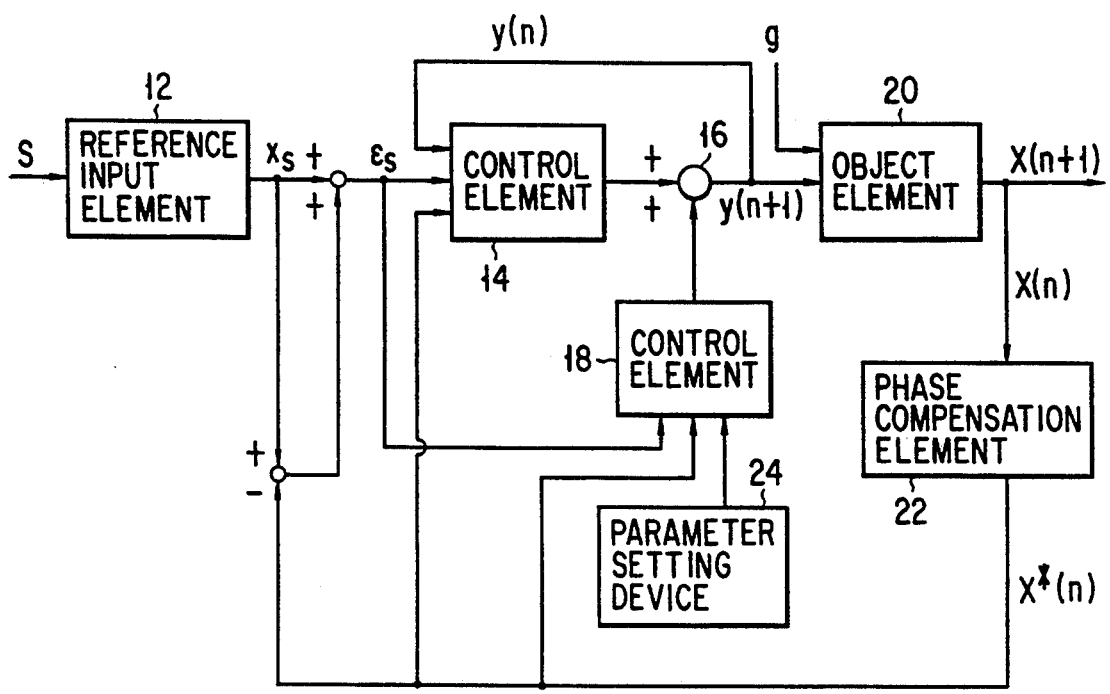
FIG. 3 is a block diagram illustrating the structure of an automatic control apparatus according to a second embodiment of the present invention.

A second embodiment will be described below. In this embodiment, in order to further increase the converging speed, the difference between the control target value $x_s$ and the current control signal $x(n)$, i.e., the deviation $\epsilon_s (= x_s - x(n))$ is considered as information also reflecting disturbance g, and $X_s (= 2x_s - x^*(n))$ is used as a new control target value (expected target value) in the arithmetic operation as shown in FIG. 3. As the sensitivity (gain) of the operating signal increases with an appeared increase in the target value according to the second embodiment, the converging speed is improved. Because the value of the control target value for the control element 14 is not $x_s$ but is changed to the expected target value $X_s (= 2x_s - x^*(n))$, the deviation value $\epsilon_s^* (= x_s - x^*(n))$ is considered as information reflecting the disturbance g. The introduction of this expected target value $X_s$ has resulted in a considerable improvement on the control accuracy as described later. For the positive characteristic, an equation involving the expected target value $X_s$ is expressed as follows like the equation (20).

$$y(n+11)$$
$$R^*(n) \cdot \{y(n) + 2kd \cdot (\Delta x_s(n) - r^*(n) \cdot \Delta x(n))\} \quad (22)$$

For the negative characteristic, that equation is expressed as follows like the equation (21).

$$y(n+1)$$
$$= (1/R^*(n)) \cdot \{y(n) - 2kd \cdot (\Delta x_s(n) - r^*(n) \cdot \Delta x(n))\} \quad (23)$$

where $$X_s = 2x_s - x^*(n)$$

$$R^*(n) = X_s/x^*(n)$$

$$r^*(n) = x_s/x^*(n)$$

With the expected target value set to $X_x = N \cdot x_s - x(n)$, $\epsilon_R(n) = (X_s/x(n)) - 1 = (N \cdot X_s/x(n)) - 2$. The converging state is expressed by $\epsilon_R(n) = 0$ when $x(n) \to x_s$. Thus, $$\lim \epsilon_R(n) = N - 2 = 0$$

$$x(n) \to x_x$$

$$\therefore N = 2$$

This proves the validity of the expected target value $X_s (= 2x_s - x^*(n))$.

The results of simulation of the control response according to the second embodiment with respect to a simple object element of the first order will now be described. It should however be noted that the compensation for the differential term is eliminated (kd=0). The control operation of this embodiment starts upon detection of $x^*(1)$ after $y(1)$ is given as an operating signal. The value of $y(1)$ is expressed as follows:

$$y(1) = K_0 \cdot (X_s/x_{max}) \cdot y_{max} \tag{24}$$

where $K_0$: parameter ($K_0 = 0.2$ to $1.0$)
$x_s$: control target value
$x_{max}$: maximum control signal
$y_{max}$: maximum operating signal Since the setting of $K_0$ differs from one control system to another and depending on the circumstance, the optimum value is given through learning control.

The results of the simulation for the positive characteristic using the equation (22) will be given below ($x_s = 5$ V and $\Delta\tau = 0.2$ sec).

n=1: y(1)=1.250→x(1)=3.536 n=2: y(2)=2.285→x(2)=4.780 n=3: y(3)=2.495→x(3)=4.995   (convergence: 99.9%)

n=4: y(4)=2.500→x(4)=5.000   (convergence: 100%)

The results of an experiment conducted on an ideal PI control system ($y(n+1) = KP \cdot \epsilon_s + y(n)$) will be given for comparison with the simulation results. Here, $x_s = 5$V, $\Delta\tau = 0.2$ sec, and $KP = 0.25$.

n=1: y(1)=1.250→x(1)=3.536 n=2: y(2)=1.616→x(2)=4.020 n=3: y(3)=1.861→x(3)=4.314 n=4: y(4)=2.033→x(4)=4.508 n=5: y(5)=2.155→x(5)=4.642 n=6: y(6)=2.244→x(6)=4.737 n=7: y(7)=2.310→x(7)=4.806 n=8: y(8)=2.358→x(8)=4.856 n=9: y(9)=2.394→x(9)=4.893 n=10: y(10)=2.421→x(10)=4.920 n=11: y(11)=2.441→x(11)=4.940 n=12: y(12)=2.455→x(12)=4.955 n=13: y(13)=2.466→x(13)=4.966 n=14: y(14)=2.475→x(14)=4.975 n=15: y(15)=2.481→x(15)=4.981 n=16: y(16)=2.485→x(16)=4.985 n=17: y(17)=2.488→x(17)=4.988 n=18: y(18)=2.490→x(18)=4.990 n=19: y(19)=2.492→x(19)=4.992 n=20: y(20)=2.493 x(20)=4.994

Figure 4:
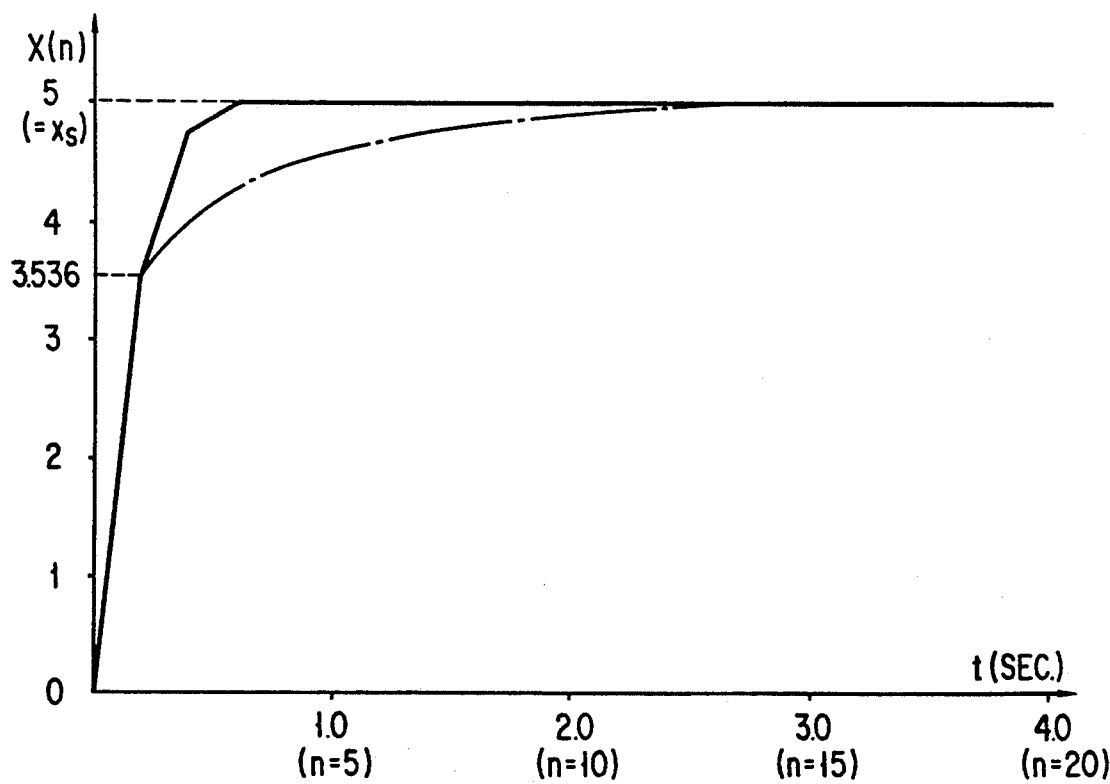
FIG. 4 is a diagram showing simulation results illustrating the operation of the second embodiment of this invention compared with an ideal PI control operation.

Those results are illustrated by way of comparison in FIG. 4; the solid line represent the present invention, and the alternate long and short dash line represents the ideal PI control operation.

It is apparent from the simulation results that the converging speed in this embodiment is sufficiently improved as compared with that of the ideal PI control operation.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

According to the present invention, as described above, by differentiating the deviation-ratio value which is the difference between the value of the ratio of the target value to the control signal and the reference value of that ratio value, the differential term includes the ratio value and the value of the differential term varies in accordance with the target value, thus making it possible to provide an automatic control apparatus capable of well controlling even an object element having a non-linear characteristic.

What is claimed is:

1. A method for performing a proportional-integral-derivative control of a device, comprising the steps of:
   a) calculating a ratio of a target value of a control signal of a control apparatus to the control signal;
   b) multiplying the ratio by an operating signal of the device;
   c) differentiating a deviation-ratio which is a difference between the ratio and a reference value of the ratio;
   d) adding together the result of said step b) of multiplying and the result of said step c) of differentiating;

e) providing the result of said adding to the device as the operating signal; and f) controlling the device using proportional-integral derivative control based on the deviation-ratio value.

2. The method according to claim 1, wherein said step a) of calculating further comprises:
   (i) doubling the target value of the control signal of the control apparatus;
   (ii) calculating a new ratio value of the doubled target value of the control signal to the control signal; and
   (iii) providing the new ratio as said ratio in step a).

3. A method for performing a proportional-integral control of a device, comprising the steps of:
   a) calculating a ratio of a target value of a control signal of a control apparatus to the control signal;
   b) multiplying the ratio by an operating signal of the device;
   c) providing the result of the multiplying to the device as the operating signal; and
   d) controlling the device using proportional-integral control based on the ratio value.

4. The method according to claim 3, wherein said step a) of calculating further comprises:
   (i) doubling the target value of the control signal of the control apparatus;
   (ii) calculating a new ratio of the doubled target value of the control signal to the control signal; and
   (iii) providing the new ratio as said ratio in step a).

5. An apparatus for supplying an operating signal to a target apparatus having a positive characteristic that makes a control signal which is controlled by the operating signal and is output from the target apparatus equal to a target signal, comprising:
   a) a first controller receiving the target signal $x_S$, a present operating signal y(n), and a present control signal x(n), and calculating $$\left(\frac{x_s}{x(n)}\right) \cdot y(n)$$

b) a parameter setting device setting a differential parameter kd of a proportional-integral-derivative control operation based on a deviation between the target value and the present control signal;
   c) a second controller receiving the target signal $x_S$, the present control signal x(n), and the differential parameter kd, and calculating $$k_d \cdot \left(\frac{x_s}{x(n)}\right) \cdot \left[\Delta x_s(n) - \left(\frac{x_s}{x(n)}\right) \cdot \Delta x(n)\right]$$

where $\Delta x_s(n) = x_s(n) - x_s(n-1)$ $\Delta x(n) = x(n) - x(n-1)$; and d) an adder adding together the results of calculation by said first controller and said second controller, wherein the result of addition the adding is supplied to the target apparatus as a next operating signal y(n+1).

6. An apparatus for supplying an operating signal to a target apparatus having a positive characteristic that makes a control signal which is controlled by the operating signal and is output from the target apparatus equal to a target signal, comprising:
   a) a processor calculating a deviation $S_x$ between a doubled target signal $2x_S$ and a present control signal x(n);
   b) a first controller receiving the deviation $X_S$, a present operating signal y(n), and a present control signal x(n), and calculating $$\left(\frac{X_s}{x(n)}\right) \cdot y(n)$$

c) a parameter setting device setting a differential parameter kd of a proportional-integral-derivative control operation based on a deviation between the target value and the present control signal;
   d) a second controller receiving the deviation $X_S$, the present control signal x(n), and the differential parameter kd, and $$2k_d \cdot \left(\frac{x_s}{x(n)}\right) \cdot \left(\Delta x_s(n) - \left(\frac{x_s}{x(n)}\right) \cdot \Delta x(n)\right)$$

calculating
   where $\Delta x_s(n) = x_s(n) - x_s(n-1)$ $\Delta x_s(n) = x_s(n) - x_s(n-1)$; and e) an adder adding together the results of calculation by said first controller and said second controller, wherein the result of the adding is supplied to the target apparatus as a next operating signal y(n+1), whereby the apparatus controls the next operating signal y(n+1) based on the ratio of said deviation $X_S$ to the present control signal x(n) multiplied by the present operating signal y(n).

7. An apparatus for supplying an operating signal to a target apparatus having a negative characteristic that makes a control signal which is controlled by the operating signal and is output from the target apparatus equal to a target signal, comprising:
   a) a first controller receiving the target signal $x_S$, a present operating signal y(n), and a present control signal x(n), and calculating $$\left(\frac{x_s}{x(n)}\right) \cdot y(n)$$

b) a parameter setting device setting a differential parameter kd of a proportional-integral-derivative control operation based on a deviation between the target value and the present control signal;
   c) a second controller receiving the target signal $x_S$, the present control signal x(n), and the differential parameter kd, and calculating $$-k_d \cdot \left(\frac{x(n)}{x_s}\right) \cdot \left[\Delta x_s(n) - \left(\frac{x_s}{x(n)}\right) \cdot \Delta x(n)\right]$$

where $\Delta x_s(n) = x_s(n) - x_s(n-1)$ $\Delta x(n) = x(n) - x(n-1)$; and d) an adder adding together the results of calculation by said first controller and said second controller, wherein the result of the adding is supplied to the target apparatus as a next operating signal $y(n+1)$, whereby the apparatus controls the next operating signal $y(n+1)$ based on the ratio of the present control signal to said target signal $x_s$ multiplied by the present operating signal $y(n)$.

8. An apparatus for supplying an operating signal to a target apparatus having a negative characteristic that makes a control signal which is controlled by the operating signal and is output from the target apparatus equal to a target signal, comprising:

a) a processor calculating a deviation $X_s$ between a doubled target signal 2 and a present control signal $x(n)$;

b) a first controller receiving the deviation $X_s$, a present operating signal $y(n)$, and a present control signal $x(n)$, and calculating $$\left(\frac{x(n)}{X_s}\right) \cdot y(n)$$

c) a parameter setting device setting a differential parameter kd of a proportional-integral-derivative control operation based on a deviation between the target value and the present control signal;

d) a second controller receiving the deviation $X_s$, the present control signal $x(n)$, and the differential parameter kd, and calculating $$-2k_d \cdot \left(\frac{x(n)}{X_s}\right) \cdot \left[\Delta x_s(n) - \left(\frac{x_s}{x(n)}\right) \cdot \Delta x(n)\right]$$

where $\Delta x_s(n) = x_s(n) - x_s(n-1)$ $\Delta x(n) = x(n) - x(n-1)$; and e) an adder adding together the results of calculation by said first controller and said second controller, wherein the result of the adding is supplied to the target apparatus as a next operating signal $y(n+1)$, whereby the apparatus controls the next operating signal $y(n+1)$ based on the ratio of the present control signal $x(n)$ to said deviation $X_s$ multiplied by the present operating signal $y(n)$.

* * * * *

UNITED STATES PATENT AND TRADEMARK OFFICE
CERTIFICATE OF CORRECTION

PATENT NO. : 5,325,288
DATED : 6/28/94
INVENTOR(S) : Satou Nobuyasu

It is certified that error appears in the above-indentified patent and that said Letters Patent is hereby corrected as shown below:

| Column | Line | |
|---|---|---|
| 5 | 49 | Change "$\Delta \varepsilon \varepsilon_s(n) - \varepsilon_x(n-1)$" to --$\Delta \varepsilon_s = \varepsilon_s(n) - \varepsilon_s(n) - \varepsilon_s(n-1)$--. |
| 6 | 61 | Change "$r(n)y(n)$." to --$r(n)\ y(n)$.--. |
| 6 | 67 | Change "$\neq$" to --$\Delta$--. |
| 7 | 28 | Change "$r^*(n)$" to --$r(n)$--; change "$r(n)$" to --$r^*(n)$--. |
| 9 | 10 | Change "$X_x = N \cdot x_s - x(n), \varepsilon_R(n) = (X_s/x(n) - 1$" to -- $X_s = N \cdot x_s - x(n), \varepsilon_R(n) = (x_s/x(n)) - 1$ --. |
| 9 | 16 | Change "$x_x$" to --$x_s$--. |
| 9 | 58 | Change "$\Delta r$" to --$\Delta \tau$--. |

UNITED STATES PATENT AND TRADEMARK OFFICE
CERTIFICATE OF CORRECTION

PATENT NO. : 5,325,288
DATED : 6/28/94
INVENTOR(S) : Satou Nobuyasu

It is certified that error appears in the above-indentified patent and that said Letters Patent is hereby corrected as shown below:

| Column | Line | |
|---|---|---|
| 10 | 29 | Change "2.493x(20)-4.994" to -- 2.493→x(20)=4.994 --. |
| 11 | 57 | Change "$x_x$" to --$x_s$--. |
| 12 | 3 | Change "$S_x$" to --$X_s$--. |
| 12 | 31 | Change "$x_s(n)$" (three occurrences) to --x(n)--. |
| 13 | 26 | Change "signal 2" to --signal 2xs--. |
| 14 | 15 | Change "$-2k_d$" to -- -2kd --. |

Signed and Sealed this

Third Day of January, 1995

Attest:

BRUCE LEHMAN

*Attesting Officer*        *Commissioner of Patents and Trademarks*